United States Patent [19]

Hartley

[11] Patent Number: 5,737,967
[45] Date of Patent: Apr. 14, 1998

[54] PIVOTING HANDLEBARS

[76] Inventor: James T. Hartley, 13962 Malena Dr., Tustin, Calif. 92680

[21] Appl. No.: 585,289

[22] Filed: Jan. 11, 1996

Related U.S. Application Data

[63] Continuation-in-part of Ser. No. 339,657, Nov. 15, 1994, abandoned, which is a continuation of Ser. No. 264,179, Jun. 22, 1994, abandoned, which is a continuation of Ser. No. 68,695, May 27, 1993, abandoned.

[51] Int. Cl.$^6$ ................................................ B62K 21/16
[52] U.S. Cl. ................................. 74/551.3; 74/551.1
[58] Field of Search ....................... 74/551.1–551.8; 280/279, 280

[56] References Cited

U.S. PATENT DOCUMENTS

| 3,863,521 | 2/1975 | Gatsos et al. | 74/551.4 |
| 4,384,497 | 5/1983 | Gatsos | 74/551.4 |
| 4,682,509 | 7/1987 | Takamiya et al. | 74/551.4 |
| 5,145,210 | 9/1992 | Lennon | 74/551.8 X |
| 5,154,095 | 10/1992 | Giard | 74/551.1 |
| 5,235,871 | 8/1993 | Yamazaki et al. | 74/551.8 |

FOREIGN PATENT DOCUMENTS

| 1022608 | 3/1953 | France | 74/551.1 |
| 8501224 | 12/1985 | Netherlands | 74/551.4 |
| 17314 | 9/1896 | United Kingdom | 74/551.4 |
| 2073113 | 10/1981 | United Kingdom | 74/551.4 |

*Primary Examiner*—Vinh T. Luong
*Attorney, Agent, or Firm*—Kenneth W. Float

[57] ABSTRACT

Cycling apparatus including pivoting handlebars that permit a rider to move the handlebars into either a drop or aerodynamic riding position, or any comfortable riding position therebetween. The apparatus comprises a cycle having a body, a housing is coupled to the body, and first and second handlebars are provided that are used to steer the cycle. Rotating apparatus is coupled to the housing and to the first and second handlebars for rotating the handlebars in unison. The handlebars are rotated between a first position wherein the handlebars are generally orthogonal to the body of the cycle and a second position wherein the handlebars are generally aligned with the body of the cycle. The rotating apparatus may comprise first and second interlocking gears, a flexible drive coupling, a set of universal joints, or any similar rotating device that permits the handlebars to rotate between the desired positions. First and second brake levers are disposed adjacent respective distal ends of the first and second handlebars adjacent a rider's hand positions. First and second gear shift levers are also disposed adjacent respective distal ends of the handlebars adjacent the rider's hand positions. Forearm pads may be disposed on a portion of the cycle to which the housing is attached. The pivoting handlebars pivot in unison to permit different riding positions while the cycle is in motion.

11 Claims, 3 Drawing Sheets

PIVOTING HANDLEBARS

This application is a continuation-in-part application of U.S. patent application Ser. No. 08/339,657, filed Nov. 15, 1994, now abandoned, which is a continuation of U.S. patent application Ser. No. 08/264,179, filed Jun. 22, 1994, now abandoned, which is a continuation of U.S. patent application Ser. No. 08/068,695, filed May 27, 1993, now abandoned.

BACKGROUND

The present invention relates to handlebars for motorcycles, bicycles and tricycles, and the like, and more particularly, to cycling apparatus that employs pivoting handlebars that pivot in unison while the cycle is in motion to permit different riding positions.

Aerodynamic bicycle handlebars have been available for approximately ten years. Originally they were used by long distance cyclists and later adopted by time trialists and triathletes to allow a rider to maintain a more aerodynamic position on the bike for longer periods of time. These "aero" bars typically loop forward, up, and in front of standard bicycle "drop" handlebars. This allows the rider to lean forward and rest his forearms on pads while placing his hands on the front-most portion of the handlebars. The pads support most of the upper body and head weight. The position of the handlebars and pads force the rider to maintain an elbows in, forward leaning, aerodynamic position. An example of such conventional aerodynamic handlebars is provided in an article entitled "Aero Answers" in *Bicycling* magazine, volume XXXI, No. 4 (May 1990), at page 180, for example.

Conventional aerodynamic handlebars force the rider into a narrow, body forward, aerodynamic position. Unfortunately, this position is very unstable at low speeds and when progressing through sharp turns. Also, since the conventional aerodynamic handlebars do not permit radical maneuvers in emergency situations, brake levers are usually located on the lower and wider drop handlebars. At the worst possible moments, those times when the rider needs to turn and brake the bike, the rider must take his hands off the conventional aerodynamic handlebars and move them down to the drop handlebars and brake levers.

Accordingly, it is an objective of the present invention to provide for improved aerodynamic handlebars that overcome the limitations of conventional aerodynamic handlebars by permitting pivoting of the handlebars to either the drop or aerodynamic riding positions.

SUMMARY OF THE INVENTION

In order to meet the above objectives, the present invention provides for pivoting handlebars that permit a rider to move the handlebars into either a drop or aerodynamic riding position, or any comfortable riding position therebetween. The pivoting handlebars pivot in unison to permit different riding positions while the cycle is in motion. The pivoting handlebars have brake levers disposed thereon which permit use thereof without requiring the rider to remove his or her hands from the handlebars.

More specifically, the present invention comprises cycling apparatus and in particular pivoting handlebars for use with a cycle. The apparatus comprises a cycle having a body (frame). A housing is coupled to the body. First and second handlebars are provided that are used to steer the cycle. Rotating apparatus are coupled to the housing and to the first and second handlebars for rotating the handlebars in unison. The handlebars are rotated between a first position wherein the handlebars are generally orthogonal to the body of the cycle and a second position wherein the handlebars are generally aligned with the the body of the cycle.

More specifically, the cycle has a front wheel that rotates around an axis that is oriented transverse to the body, and a rotatable steering shaft that is coupled to a front portion of the body and to the front wheel and that has a steering axis relative to which the front wheel is rotated to steer the cycle. The pivoting handlebars comprise first and second handlebars each having first and second ends that are coupled to the rotatable steering shaft and that are rotatable as a unit by a rider relative to their respective first ends to rotate the steering shaft around the steering axis and thus steer the cycle. The pivoting handlebars comprise a pivoting mechanism, or rotating means or apparatus, having a rotational axis that is substantially parallel to the steering axis that is coupled between the first ends of the first and second handlebars and the rotatable steering shaft. The rotational axis is the axis around which the handlebars rotate when moved by the rider. The rotating means is designed to rotate the handlebars in unison relative to the steering axis in response to forward and backward motion of the handlebars by the rider. The handlebars are rotatable between a first position wherein the second ends of the handlebars are disposed distal from the body of the cycle, and a second position wherein the second ends of the handlebars are rotated around the rotational axis and disposed forward relative to the first position. Depending upon the relative angle of the rotational axis, the second ends of the handlebars may be rotated around the rotational axis and disposed forward and upward relative to the first position. This is a direct consequence of the fact that the steering axis is generally parallel to the rotational axis of the pivoting handlebars or pivoting mechanism.

The rotating apparatus may comprise first and second interlocking gears, a flexible drive coupling, a set of universal joints, or any similar rotating device that permits the handlebars to rotate between the desired positions. First and second brake levers are generally disposed adjacent respective distal ends of the first and second handlebars. First and second gear shift levers are generally disposed adjacent respective distal ends of the first and second handlebars. The body typically comprises a tubular member to which the housing is attached. First and second forearm pads may also be disposed on the tubular member or the housing.

The present invention may be used with any bicycle, including a motorcycle, a tricycle, or a bicycle, and provides for handlebars that pivot in unison to allow for different positions thereof. The present pivoting handlebars maintain control of the bicycle while it is in motion. More specifically, the pivoting handlebars may be moved between a first position that puts a cyclist's hands and body into an aerodynamic riding position, and to a second position that is a more stable position for emergency maneuvers and slow speed handling.

By moving the present pivoting handlebars into its aerodynamic position, the rider is moved into a relatively narrow, body forward, aerodynamic position. By pivoting the handlebars into the lower drop position, the rider is put in a stable position for cycling at low speeds and through sharp turns. Also, the brake levers are located on a single set of handlebars, and thus permit radical maneuvers in emergency situations where braking is required. At those times when the rider needs to turn and brake the bike, the rider has ready access to the brake levers.

The present invention allows mounting of the brake levers on a single set of handlebars, and the handlebars may be conveniently positioned in either the aerodynamic hand position (up and forward), or pivoted back to a lower, wider, and more stable hand position. The rider's hands need never leave the handlebars to reach the brake levers.

Although the primary use of the pivoting handlebars is to permit pivoting of the handlebars between aerodynamic and stable riding positions, the present invention may also be used in a variety of other applications. The present invention may be used on mountain bikes wherein different positions of the bars are used for uphill and downhill riding, respectively. The present invention may also be used on motorcycles to provide for upright and laid back riding positions, or on any other vehicle that relies on handlebars, rather than a steering wheel, to steer the vehicle.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
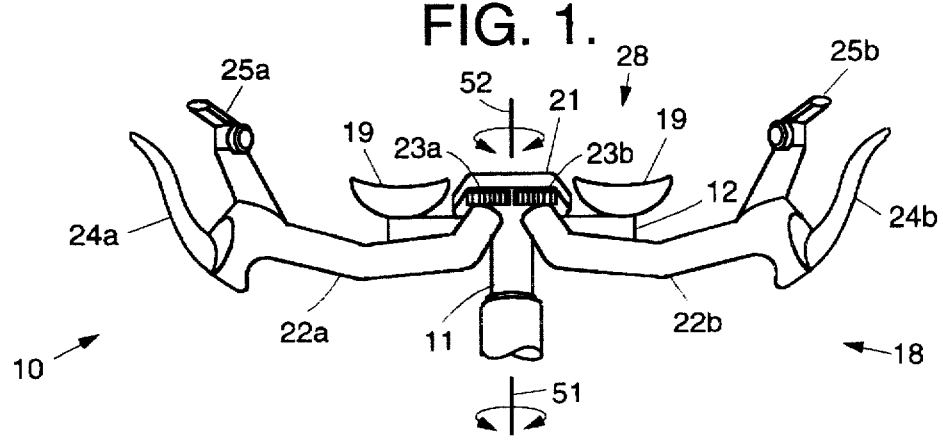
FIG. 1 shows a front view of an embodiment of pivoting handlebars in accordance with the principles of the present invention wherein the handlebars are in a drop position.

Referring to the drawing figures, FIG. 1 shows a front view of an embodiment of pivoting handlebars 10 in accordance with the principles of the present invention. The pivoting handlebars 10 may be employed with any conventional cycle 18, such as a bicycle, tricycle, mountain bikes, or motorcycle, or the like. The cycle 18 includes a body (frame) or stem 11 that is adapted to secure the handlebars 10 to the cycle 18. The stem 11 is secured to the cycle 18 using a screw or bolt 13, for example. The shape of the stem 11 may be different for each type of cycle 18.

Figure 5:
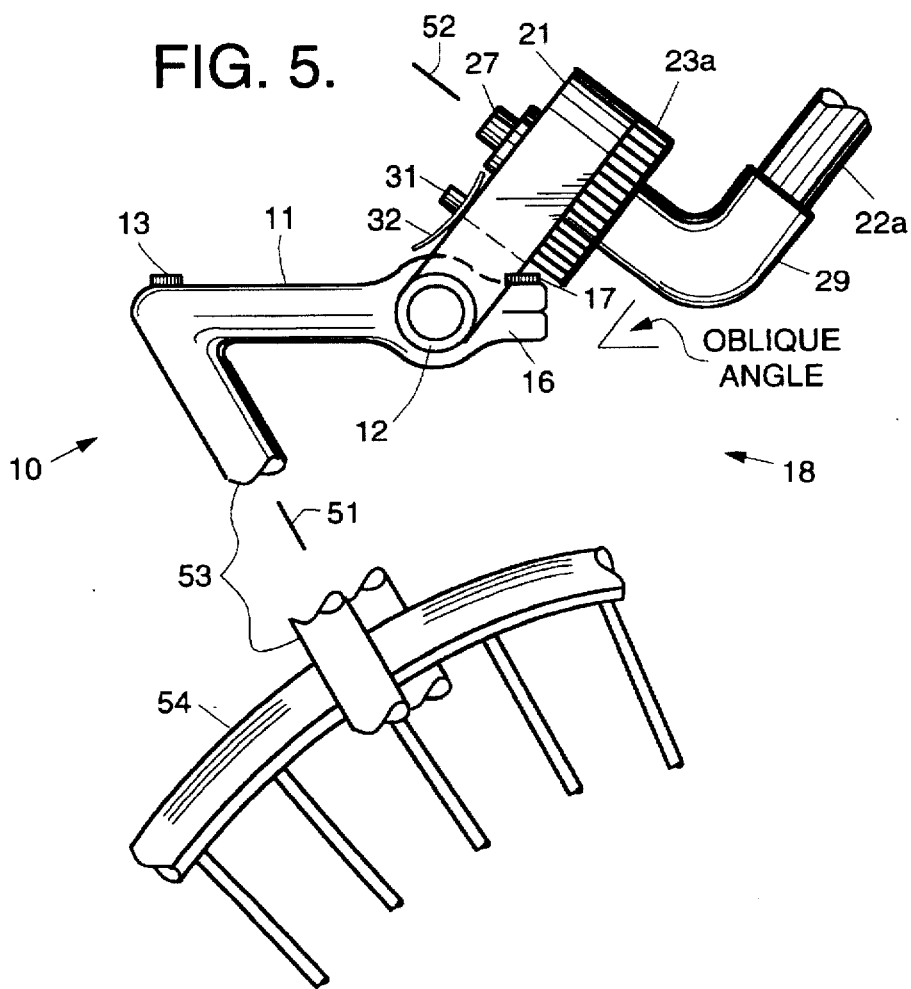
FIG. 5 shows a side view of the pivoting mechanism of FIG. 4.

More specifically, and also with reference to FIG. 5, the cycle 18 has a front wheel 54 that rotates around an axis that is oriented transverse to the body 11, and a rotatable steering shaft 53 that is coupled to a front portion of the body 11 and to the front wheel 54 and that has a steering axis 51 relative to which the front wheel 54 is rotated to steer the cycle 18. The pivoting handlebars 10 comprise first and second handlebars 22a, 22b each having first and second ends that are coupled to the rotatable steering shaft 53 and that are rotatable as a unit by a rider relative to their respective first ends to rotate the steering shaft 53 around the steering axis 51 and thus steer the cycle 18. The pivoting handlebars 10 comprise a pivoting mechanism 28 (rotating means or apparatus 28) having a rotational axis 52 that is substantially parallel to the steering axis 51 that is coupled between the first ends of the first and second handlebars 22a, 22b and the rotatable steering shaft 53. The rotational axis 52 is the axis around which the handlebars 22a, 22b rotate when moved by the rider. The pivoting mechanism 28 is designed to rotate the handlebars 22a, 22b in unison relative to the steering axis 51 in response to forward and backward motion of the handlebars 22a, 22b by the rider. The handlebars 22a, 22b are rotatable between a first position wherein the second ends of the handlebars 22a, 22b are disposed distal from the body 11 of the cycle 18, and a second position wherein the second ends of the handlebars 22a, 22b are rotated around the rotational axis 52 and disposed forward and upward relative to the first position. Depending upon the relative angle of the rotational axis 52, the second ends of the handlebars 22a, 22b may be rotated around the rotational axis 52 into a second position that is disposed forward and upward relative to the first position. This is a direct consequence of the fact that the steering axis 51 is generally parallel to the rotational axis 52 of the pivoting handlebars 10 or pivoting mechanism 28.

Figure 3:
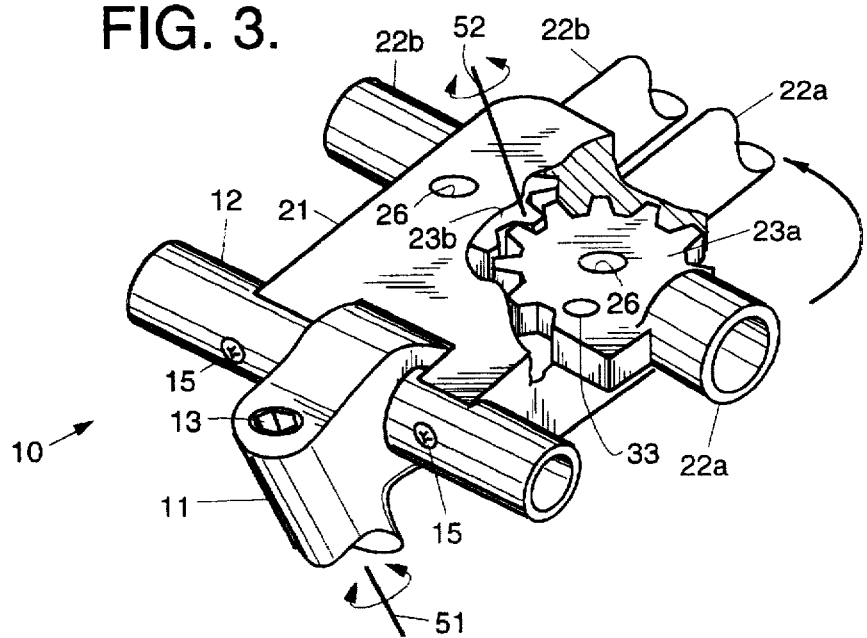
FIG. 3 shows a partially cutaway perspective view of a pivoting mechanism employed in the pivoting handlebars shown in FIGS. 1 and 2.

The pivoting handlebars 10 comprise a housing 21 that is secured to the stem 11 in a conventional manner. One possible arrangement for securing the pivoting handlebars 10 to the cycle 18 is shown in FIG. 3 and will be discussed in detail below. The housing 21 and the stem 11 may also be a single integral component that is die cast or machined from a single piece of material, for example. FIG. 1 shows the pivoting handlebars 10 secured to a short piece of tubing 12 which may be comprised of tubing similar to the conventional handlebars of the cycle 18. Attached to the tubing 12 are two forearm rests or pads 19 which may be secured to the tubing 12 or the housing 21 in a conventional manner, such as by screws or bolts, for example.

In a reduced to practice embodiment, the pivoting handlebars 10 includes two handlebars 22a, 22b which are attached to a pivoting mechanism 28 that comprises the housing and two rotatable gears 23a, 23b that permit the handlebars 22a, 22b to rotate in unison relative to the stem 11 of the cycle 18. Conventional brake levers 24a, 24b are attached to outer ends of the handlebars 22a, 22b in a conventional manner. Also, gear shift levers 25a, 25b are secured to the outer ends of the handlebars 22a, 22b in a conventional manner. Cabling for the brake levers 24a, 24b and gear shift levers 25a, 25b may be routed along the outside of the handlebars 22a, 22b and may be taped thereto.

Figure 2:
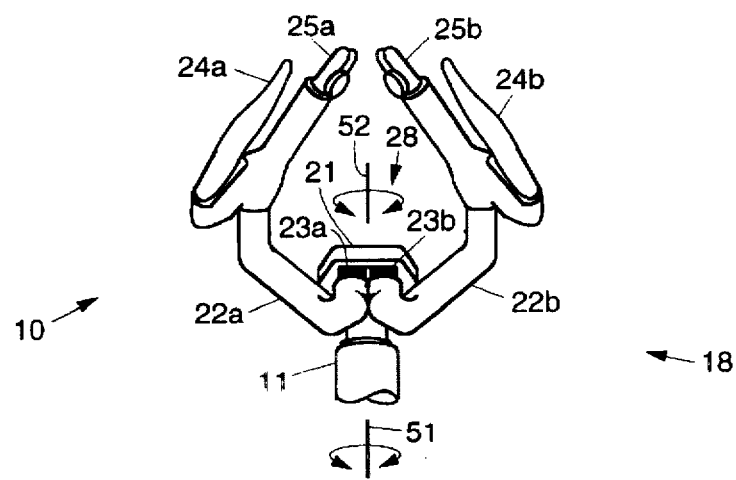
FIG. 2 shows a front view of the pivoting handlebars of FIG. 1 wherein the handlebars are in an aerodynamic position.

FIG. 1 shows the handlebars 22a, 22b disposed in a drop position, wherein the handlebars 22a, 22b extend in a generally horizontal direction. FIG. 2 shows a front view of the pivoting handlebars 10 of FIG. 1 wherein the handlebars 22a, 22b are in an upright, aerodynamic position. The aerodynamic position is achieved by rotating the handlebars 22a, 22b in unison by means of the gears 23a, 23b.

FIG. 3 shows a partially cutaway perspective view of the pivoting mechanism 28 employed in the pivoting handlebars 10 shown in FIGS. 1 and 2. The pivoting mechanism 28 is shown secured to the tube 12 using conventional screws or bolts 15 which extend through holes (not shown) in the tube 12 and into the housing 21. As can be seen in FIG. 3, each of the handlebars 22a, 22b are attached to the gears 23a, 23b, whose teeth interlock so that they pivot in unison. FIG. 3 shows the handlebars 22a, 22b in the drop position (solid lines) and in the aerodynamic position (phantom lines), with the arrow indicating the limits of motion thereof. Each of the gears 23a, 23b have through holes 26 disposed therein and may be secured to the housing 21 in a conventional manner using bolts 27 (shown in FIGS. 4 and 5) that extend through the holes into a threaded hole (not shown) in the housing 21.

Figure 4:
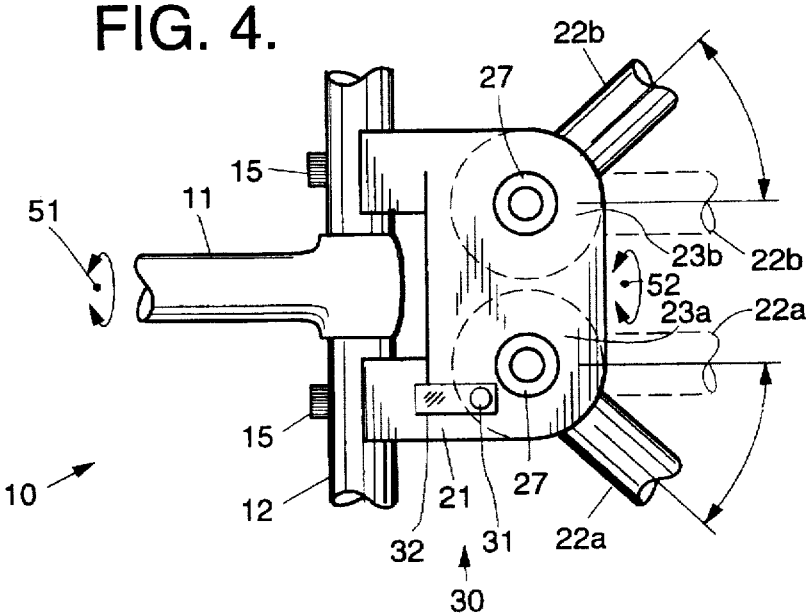
FIG. 4 shows a top view of the pivoting mechanism of FIG. 3.

FIG. 4 shows a top view of the pivoting handlebars 10 of FIG. 3. The connection of the housing 21 to the tube 12 by means of the bolts 15 is shown more clearly. The gears 23a, 23b are shown secured to the housing by means of the bolts 27. FIG. 4 also shows the handlebars 22a, 22b rotated toward the drop position (solid lines) and to the aerodynamic position (phantom lines), with the arrows indicating the the relative motion thereof.

FIG. 5 shows a side view of the pivoting handlebars 10 shown in FIG. 4 with the handlebars 22a, 22b rotated into the aerodynamic position. The securing of the stem 11 to the cycle 18 by means of the bolt 13 is shown more clearly. FIG. 4 also illustrates the manner in which the pivoting handlebars 10 are secured to the cycle 18. The tube 12 (conventional handlebars) is secured to the stem 11 using a split ring 16 and bolt 17 in a conventional manner. One handlebar 22a is shown attached to a 90 degree elbow 29 which is in turn secured to the gear 23a by welding, for example. As can be seen in FIG. 5, the housing 21 may be positioned in many relative positions by appropriately loosening the split ring 16 and rotating the pivoting handlebars 10 so that the handlebars 22a, 22b are positioned in a comfortable position. The housing 21 is then clamped into that position by tightening the split ring 16 with the bolt 17. The handlebars 22a, 22b are then free to pivot relative to the axis of the gears 23a, 23b to move them to either the aerodynamic or drop positions, or any position therebetween. FIG. 5 also illustrates the relative parallelism between the steering axis 51 and the rotational axis 52 of the pivoting handlebars 10 and pivoting mechanism 28.

The reason the pivoting handlebars 22a, 22b are stable in all positions is that they are linked to each other by means of the gears 23a, 23b. When one handlebar 22a is pivoted in or out the other handlebar 22b moves in the opposite direction, exactly the same amount. Since steering a cycle 18 involves pushing on one of the handlebars 22a, 22b and pulling on the other, there is no tendency for the handlebars 22a, 22b to pivot into another position at those times. An optional locking mechanism 30 is comprised of a spring loaded plunger 31 which mounts in the housing 21 and engages a cavity 33 in the face of the gear 32a when the handlebars 22a, 22b pivot into the drop position. To unlock the gear 23a and thus the handlebars 22a, 22b to allow pivoting into the aerodynamic position, a lever 32 or similar device is incorporated to pull the spring loaded plunger 31 out of the cavity 33. The optional locking mechanism 30 is adapted to lock the handlebars 22a, 22b in the drop or "stable" position and may be used for mountain bikes, if necessary. However, this locking mechanism appears to be unnecessary for use on road bikes. The pivoting mechanism 28 does not pivot loosely. The frictional drag of the gears 23a, 23b against the housing 21 causes the handlebars 22a, 22b to stay in any position to which they are moved. A nominal amount of hand pressure pivots the handlebars 22a, 22b into any desired position.

The handlebars 22a, 22b are moved into a wider and lower position in the stable position. The gear shift levers 25a, 25b are also mounted on the handlebars 22a, 22b, at the very ends. This positioning further enhances the cyclists control of the cycle 18 with minimal hand movement. The forearm pads 19 are generally used when the handlebars 22a, 22b are positioned in the aerodynamic riding position.

Although the first and second interlocking gears 23a, 23b have been disclosed for providing handlebar rotating 23a, 23b apparatus that may be used in the present invention, other embodiments are also contemplated by the present invention. In particular, if the pivotal axis of rotation for the handlebars 22a, 22b requires other than the parallel axis employed with the straight spur gears 23a, 23b, three other mechanisms may be used. These include bevel and miter gears that may be used for pivotal axis of 90 degrees. One or more sets of universal joints allow for limitless angular variations of coordinated movement as will a flexible drive coupling. These three mechanisms allow different pivoting actions of the handlebars 22a, 22b while maintaining the coordinated motion of both handlebars 22a, 22b required for movement between the drop and aerodynamic positions.

Figure 6:
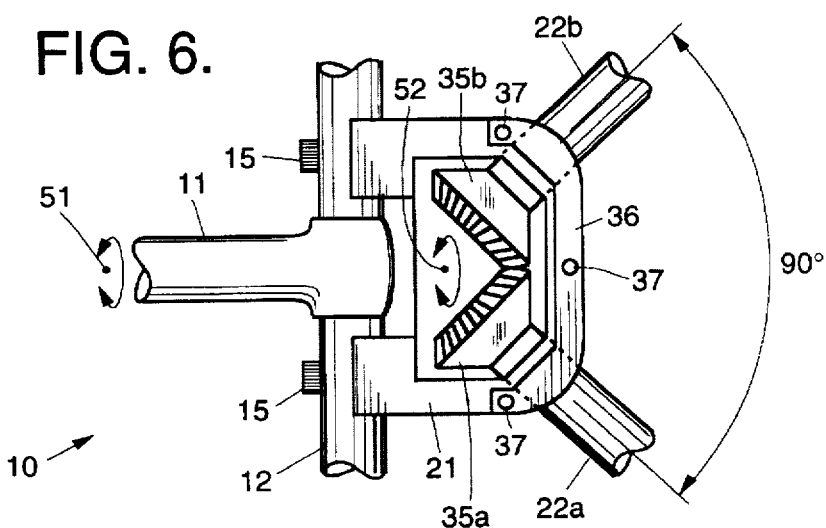
FIG. 6 shows a top view of an embodiment of the pivoting handlebars 10 employing bevel or miter gears.
Figure 7:
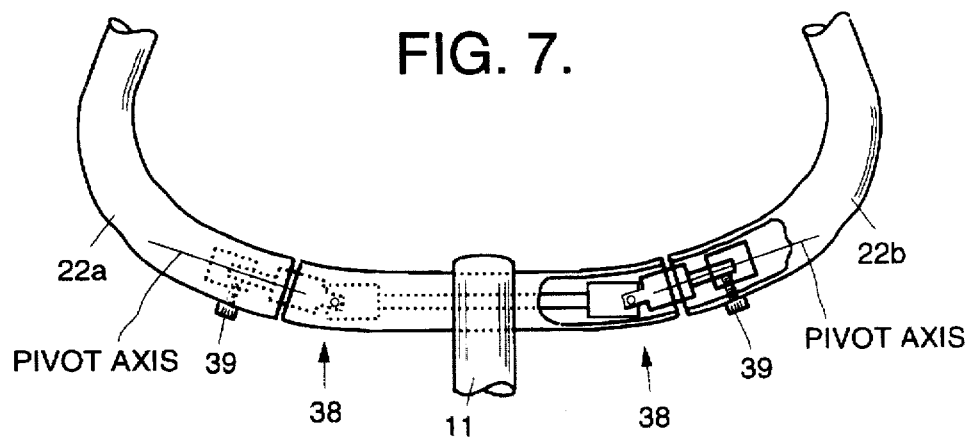
FIG. 7 shows an embodiment of the pivoting handlebars 10 employing universal joints.
Figure 8:
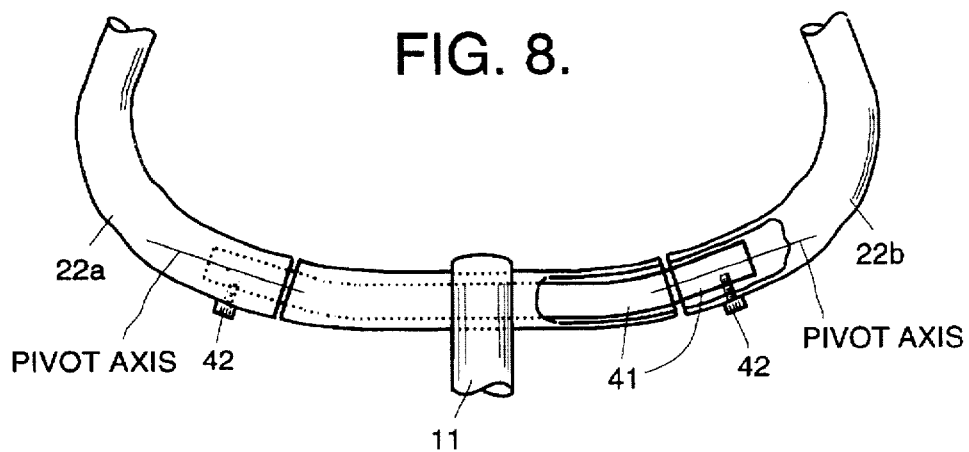
FIG. 8 shows a partially cutaway view of an embodiment of the pivoting handlebars 10 employing a flexible coupling.

FIG. 6 shows a top view of an embodiment of the pivoting handlebars 10 employing bevel or miter gears 35a, 35b, confined by means of a cover plate 36 that is secured to the housing 21 by means of a plurality of screws 37. FIG. 7 shows a top view of an embodiment of the pivoting handlebars 10 employing universal joints 38 and set screws 39 to secure ends of the universal joints 38 to the handlebars 22a, 22b. FIG. 8 shows a partially cutaway top view of an embodiment of the pivoting handlebars 10 employing a flexible coupling 41 (shown partially in phantom) and set screws 42 to secure ends of the flexible coupling 41 to the handlebars 22a, 22b. These figures will not be described in further detail due to the relative ease of understanding the implementation details shown in these drawing figures.

Although the pivoting handlebars 10 described above have been described with reference to pivoting of the handlebars 22a, 22b between aerodynamic and stable riding positions, the present invention may be used in a variety of other applications. The present invention may be used on mountain bikes wherein different positions of the bars are used for uphill and downhill riding, respectively. The present invention may also be used on motorcycles to provide for upright and laid back riding positions, or on any other vehicle that relies on handlebars, rather than a steering wheel, to steer the vehicle.

Thus there has been described new and improved cycling apparatus that employs pivoting handlebars that pivot in unison while a cycle is in motion to permit different riding positions. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Cycling apparatus comprising:
   a body;
   a rotatable steering shaft coupled to a front portion of the body having a steering axis relative to which the cycle is rotated and steered;
   a transverse member coupled to and extending transverse to the body;
   first and second handlebars each having a first end and a second end;
   handlebar rotating apparatus, attached to the first ends of the first and second handlebars and attached to the transverse member, that is rotatable about an axis through the transverse member that extends transverse to the body, and wherein the handlebar rotating apparatus comprises means for rotating the first and second handlebars about respective axes that are substantially perpendicular to a plane extending through the transverse member and the handlebar rotating apparatus, in response to forward and backward motion of the handlebars, to rotate the handlebars in unison between a first position wherein the second ends of the handlebars are disposed distal from the body, and a second position wherein the second ends of the handlebars are disposed forward relative to the first position.

2. The apparatus of claim 1 wherein the handlebar rotating apparatus comprises:

a housing attached to the transverse member and having an end distal from the transverse member extending forward relative to the transverse member; and first and second interlocking gears rotatably attached to the housing and respectively coupled to the first ends of the first and second handlebars, and wherein the gears are rotatable about the axes that are substantially perpendicular to the plane extending through the transverse member and the housing and are responsive to forward and backward motion of the handlebars to rotate the handlebars between the first and second positions.

3. The apparatus of claim 1 further comprising first and second brake levers disposed adjacent respective second ends of the first and second handlebars.

4. The apparatus of claim 3 further comprising first and second gear shift levers disposed adjacent respective second ends of the first and second handlebars.

5. The apparatus of claim 3 further comprising first and second forearm pads disposed on the first and second handlebars.

6. Apparatus, for use with a cycle having a body and a rotatable steering shaft coupled to the body, said rotatable steering shaft having a steering axis relative to which the cycle is rotated and steered, said cycle having first and second handlebars respectively having a first end and a second end, said apparatus comprising:

a transverse member attached to the body that extends transverse to the body;

a housing attached to the transverse member that is rotatable about an axis through the transverse member that extends transverse to the body, said housing extending forward relative to the transverse member; and first and second interlocking gears rotatably attached to the housing that are rotatable about axes that are substantially perpendicular to a plane extending through the transverse member and the housing, and wherein the first and second gears are respectively coupled to the first ends of the first and second handlebars and comprise means for rotating the first and second handlebars in unison in response to forward and backward motion of the handlebars between a first position wherein the handlebars are transverse to the body of the cycle such that the second ends of the handlebars are disposed distal from the body, and a second position wherein the handlebars are rotated forward relative to the first position.

7. Apparatus, for use with a cycle comprising a body and first and second handlebars each having a first end and a second end, said apparatus comprising:

a transverse member coupled to the body that extends transverse to the body;

first and second brake levers disposed adjacent respective second ends of the first and second handlebars;

first and second forearm pads disposed on the transverse member;

handlebar rotating apparatus coupled to the first ends of the first and second handlebars and attached to the transverse member, and wherein the handlebar rotating apparatus is rotatable about an axis through the transverse member that extends transverse to the body, and wherein the handlebar rotating apparatus comprises means, responsive to forward and backward motion of the handlebars, for rotating the handlebars in unison about axes that are substantially perpendicular to a plane extending through the transverse member and the handlebar rotating apparatus between a first position wherein the second ends of the handlebars are disposed distal from the body, and a second position wherein the second ends of the handlebars are disposed forward relative to the first position.

8. The apparatus of claim 7 wherein the transverse member comprises a tubular member, and wherein the handlebar rotating apparatus comprises:

a housing attached to the tubular member; and first and second interlocking gears that are each rotatably attached to the housing and respectively coupled to the first ends of the first and second handlebars, that are rotatable about axes that are substantially perpendicular to a plane extending through the tubular member and the housing, which gears are rotatable in response to the forward and backward motion of the handlebars to cause the handlebars to rotate in unison between the first and second positions.

9. Cycling apparatus comprising:

a body;

a tubular member that is coupled to and that extends transverse to the body;

first and second handlebars each having a first end and a second end;

first and second brake levers disposed adjacent respective second ends of the first and second handlebars;

first and second gear shift levers disposed adjacent respective second ends of the first and second handlebars;

first and second forearm pads disposed on the tubular member;

handlebar rotating apparatus attached to the first ends of the first and second handlebars and attached to the tubular member, and wherein the handlebar rotating apparatus is responsive to forward and backward motion of the handlebars and comprises means for rotating the handlebars in unison about axes that are substantially perpendicular to a plane extending through the tubular member and the handlebar rotating apparatus between a first position wherein the second ends of the handlebars are disposed distal from the body, and a second position wherein the second ends of the handlebars are disposed forward relative to the first position.

10. The apparatus of claim 9 wherein the handlebar rotating apparatus comprises:

a housing attached to the tubular member and having an end distal from the tubular member that extends forward relative thereto; and first and second interlocking gears rotatably attached to the housing and respectively coupled to the first ends of the first and second handlebars, and wherein the gears are rotatable about axes that are substantially perpendicular to a plane extending through the tubular member and the housing, which gears are responsive to forward and backward motion of the handlebars to rotate the handlebars between the first and second positions.

11. Apparatus, for use with a cycle comprising a body, a front wheel that rotates around an axis that is oriented transverse to the body, a rotatable steering shaft that is coupled to a front portion of the body and to the front wheel and that has a steering axis relative to which the front wheel is rotated to steer the cycle, and first and second handlebars each having first and second ends that steer the cycle, wherein said apparatus comprises:

handlebar rotating means coupled between the first ends of the first and second handlebars and the rotatable steering shaft, for rotating said handlebars in unison relative to said steering axis in response to forward and backward motion of the handlebars by the rider, and for rotating said handlebars between a first position wherein the second ends of the handlebars are disposed distal from the body of the cycle, and a second position wherein the second ends of the handlebars are disposed forward relative to the first position;

a transverse member attached to the body that extends transverse to the body; and wherein the handlebar rotating means comprises:

a housing attached to the transverse member that has an end distal from the transverse member that extends forward relative to the transverse member; and first and second interlocking gears rotatably attached to the housing and respectively coupled to the first ends of the first and second handlebars for rotating the first and second handlebars in unison in response to forward and backward motion of the handlebars about axes that are substantially perpendicular to a plane extending through the transverse member and the housing, and for rotating the handlebars between a first position that disposes the handlebars transverse to the body of the cycle such that the second ends of the handlebars are disposed distal from the body, and a second position that disposes the handlebars forward relative to the first position.

\* \* \* \* \*